United States Patent
Hopkins et al.

[11] Patent Number: 6,016,227
[45] Date of Patent: Jan. 18, 2000

[54] APPARATUS AND METHOD FOR PRODUCING AN IMPROVED LASER BEAM

[75] Inventors: John A. Hopkins, Tullahoma; Frederick A. Schwartz, Woodbury; Mary Helen McCay; Thurman Dwayne McCay, both of Monteagle; Narendra B. Dahotre, Tullahoma; John Brice Bible, South Pittsburg, all of Tenn.

[73] Assignee: The University of Tennessee Research Corporation, Knoxville, Tenn.

[21] Appl. No.: 09/127,396

[22] Filed: Jul. 31, 1998

[51] Int. Cl.[7] .......................... G02B 13/08; G02B 3/02; B23K 26/00
[52] U.S. Cl. ................ 359/668; 359/671; 359/719; 219/121.6; 219/121.61
[58] Field of Search ........................ 359/662, 668, 359/671, 708, 719; 219/121.6, 121.65, 121.66, 121.73, 121.75, 121.85; 372/31, 108, 109

[56] References Cited

U.S. PATENT DOCUMENTS

| | | | |
|---|---|---|---|
| 3,705,758 | 12/1972 | Haskal | 350/160 R |
| 3,848,104 | 11/1974 | Locke | 219/121 L |
| 4,475,027 | 10/1984 | Pressley | 219/121 L |
| 5,059,013 | 10/1991 | Jain | 359/503 |
| 5,095,386 | 3/1992 | Scheibengraber | 359/668 |
| 5,331,466 | 7/1994 | Van Saarloos | 359/723 |
| 5,406,042 | 4/1995 | Engelfriet et al. | 219/121.68 |

OTHER PUBLICATIONS

"Line–Focussing Optics for Multiple–Pass Laser Welding," NASA Tech Briefs MFS–29976 (Date unknown).
Bewsher et al., "Design of single–element laser–beam shape projectors," vol. 35 Applied Optics, No. 1, pp. 1654–1658 (Apr. 1, 1996).
Wei et al, "Investigation of High–Intensity Beam Characteristics on Welding Cavity Shape and Temperature Distribution," vol. 112 Jnl of Heat Transfer 163, pp. 163–169 (Feb. 1990).
Veldkamp, "Technique for generating focal–plane flattop laser–beam profiles," vol. 53, Rev. Sci. Instrum., No. 3, 295–97 (Mar. 1982).
Veldkamp, "Laser Beam Profile Shaping With Binary Diffraction Gratings," vol. 38, Optics Communications No. 5,6, pp. 381–386 (Sep. 1, 1981).
Veldkamp, "Laser beam profile shaping with interlaced binary diffraction gratings," vol. 21, Applied Optics No. 17, pp. 3209–12 (Sep. 1, 1982).
Veldkamp et al., "Beam profile shaping for laser radars that use detector arrays," vol. 21 Applied Optics no. 2, pp. 345–356 (Jan. 15, 1982).
Cullis et al., "A device for laser beam diffusion and homogenisation," vol. 12, J. Phys. E: Sci. Instrum., pp. 688–689 (1979).
Data sheet No. 512, Catalog Sheet for "Spawr Integrator"; by Spawr Optical Research, Inc. (Jun. 1986).

(List continued on next page.)

*Primary Examiner*—Georgia Epps
*Assistant Examiner*—David N. Spector
*Attorney, Agent, or Firm*—Duane, Morris & Heckscher LLP

[57] ABSTRACT

This invention relates to an improved laser beam useful in material surface processing and an apparatus for producing the improved laser beam. The improved laser beam of the present invention comprises a power distribution that is more intense at the outer regions than in the central region. The invention includes an apparatus comprising a power spherical and cylindrical optical elements aligned to focus and/or shape a laser beam into a novel profile useful in material surface processing. The invention further includes a method of using this apparatus to focus and/or shape a laser beam for producing Laser Induced Surface Improvements, hereinafter referred to as "LISI".

15 Claims, 4 Drawing Sheets

OTHER PUBLICATIONS

Airforce Writing Aeronautical Laboratories Report (AFWAL–TR–84–4047), "Calculations Used in the Design of a Refractive Laser Beam Homogenizer," 18 pp. (Jan. 1983–Mar. 1984).

Chen et al., The Use of a Kaleidoscope to Obtain Uniform Flux Over a Large Area in a Solar or Arc Imaging Furnace. vol. 2, Applied Optics, No. 3, pp. 265–272 (Mar. 1963).

Grojean et al., "Production of flat top beam profiles for high energy lasers," Rev. Sc. Instru. 51(3), pp. 375 and 377 (Mar. 1980).

Belvaux et al., "A Method for Obtaining a Uniform Non Gaussian Laser Illumination," vol. 15, Optics Communications No. 2, pp. 193–195 (Oct. 1975).

Bruno et al., "Laserbeam Shaping for Maximum Uniformity and Minimum Loss," Lasers & Applications, pp. 91–94 (Apr. 1987).

Frieden Lossless Conversion of a Plane Laser Wave to a Plane Wave of Uniform Irradiance, vol. 4, Applied Optics, No. 11, pp. 1400–1405 (Nov. 1995).

Fernelius et al., "Design and Testing of a Refractive Laser Beam Homogenizer," Technical Report, distributed by Defense Technical Information Center, 46 pp. (Mar. 9, 1987).

Smurov et al., "Peculiarities of pulse laser alloying: Influence of spatial distribution of the beam," J. Appl. Phys. 71(7) pp. 3147–3158 (Apr. 1, 1992).

Gori et al., "Shape–invariance range of a light beam," vol. 21, No. 16, Optics Letters, pp. 1205–1207 (Aug. 15, 1996).

Oswald et al., "Measurement and modelling of primary beam shape in an ion microprobe mass analyser," IOP Publishing, pp. 255–259 (Jun. 26, 1989).

Bett et al., "Binary phase zone–plate arrays for laser–beam spatial–intensity distribution conversion," vol. 34, No. 20 Applied Optics, pp. 4025–4036 (Jul. 10, 1995).

E. Galletti et al., Transverse Mode Selection in Apertured super–Gaussian Resonators, Applied Optics, vol. 36, No. 6, pp. 1269–1277, Feb. 20, 1997.

S. Charschan, Laser Processing Fundamentals, "Lasers in Industry" (van Nostrand Reinhold Company) Chapter 3, Sec 3–1, pp. 139–145, 1972 Only Date Available.

APPARATUS AND METHOD FOR PRODUCING AN IMPROVED LASER BEAM

BACKGROUND OF THE INVENTION

1. Field of the Invention

This invention relates to an improved laser beam useful in material surface processing and an apparatus for producing the improved laser beam. The improved laser beam of the present invention comprises a power distribution that is more intense at the outer regions than in the central region. The invention includes an apparatus comprising optical elements aligned to focus and/or shape a laser beam into a novel profile useful in material surface processing. The laser beam and apparatus of the present invention are useful for producing Laser Induced Surface Improvements, hereinafter referred to as "LISI".

2. Description of the Prior Art

Laser beams have been used to treat and/or process a workpiece, such as a piece of metal. Prior art devices employing laser beams for materials processing have comprised a beam delivery system and a movement system for moving the workpiece relative to the beam. The process effect that the beam has upon the workpiece is a function of many variables, including but not limited to, power distribution and beam shape. Uniform processing of the workpiece surface by the beam is normally desired.

One family of prior art beam processing devices have the disadvantage of nonuniform surface processing because the beams used by such devices have Gaussian or normal power distributions. Jones et al., "Laser-beam Analysis Pinpoints Critical Parameters", *Laser Focus World* (January 1993). Another type of prior art laser beam has an equalized or uniform power distribution across the cross sectional area of the beam. Such a beam is described in U.S. Pat. No. 5,124,993. Such an equalized power distribution can result in less energy deposition at the outer regions of the laser beam irradiation zone due to increased heat transfer in these regions.

This processing nonuniformity results in surface irregularities in the processed workpiece and nonuniform processing depth under the surface area of the workpiece irradiated by the beam. Prior art beam configurations are typically circular. The power density of such circular beams is greatest at the center, thereby resulting in a maximum energy deposition at the center of the beam. The power distribution of typical prior art beams is shown in FIG. 1A.

In LISI processes, where the power at point A is constant as a function of time, the energy deposition at point A, $ED_A$, is proportional to the product of the power at point A, $P_A$, and the length of time, T, that point A was irradiated as shown. Where the power distribution is spatially nonuniform, the resulting energy deposition distribution is proportionally nonuniform.

Another drawback of the Gaussian power distribution of prior art beams is that the power density and corresponding energy deposition decline as a function of radial distance from the beam center. Accordingly, workpieces processed with such prior art beams are overprocessed in the central beam region and underprocessed in the outer beam regions. The depth of processing is proportional to the power distribution. The processed region is referred to herein as "the melt region". A typical melt region of a prior art beam having a Gaussian distribution is shown in FIG. 1 B. The temperature history resulting from the melt region profile depicted in FIG. 1 B and the power distribution in FIG. 1 A, is shown in FIG. 1C.

Prior art processing methods employ beam overlap during processing of the workpiece to increase the processing depth of the underprocessed outer regions. For LISI processes, surface characteristics such as smoothness and homogeneity of composition are important, particularly for hardness and corrosion resistant properties. The beam overlap required with prior art beam processing methods results in nonuniformities in processing depth, composition and surface profile. All of these nonuniformities are undesirable.

In LISI processes employing the deposition of a precursor material on the workpiece prior to irradiation, the low power densities in the outer region of the circular beam can result in the melting and removal of the precursor material before it is incorporated into the substrate melt. This can result in nonprocessed irradiated regions.

The efficiency of beam processing systems is a function of many variables, including but not limited to beam shape, size and power distribution. Prior art beam processing devices have the disadvantage of inefficient processing rates, resulting in part from, small beam area, nonuniform power distribution and circular beam shape.

The present invention offers the advantages of (a) improved power distribution, (b) improved surface quality, and (c) improved surface processing rate. These advantages are achieved through the use of a beam shaping and focusing apparatus that produces an improved laser beam with a novel power distribution that is increased at the outer regions relative to the central region. Improved surface quality results from the improved power distribution of the present invention. The improved processing rate results from the larger, noncircular beam surface area, and the more uniform power distribution.

SUMMARY OF THE INVENTION

The present invention comprises an improved laser beam for material surface processing as well as an apparatus for producing this improved laser beam.

The laser beam further comprises a power distribution that is substantially constant in the central region, increased at the outer regions, and which decreases in a substantially step function fashion at the end regions. The term "substantially constant in the central region", as used herein, means that the maximum range of power distribution variance in the central region is less than 7.5% of the maximum power level in the central region.

This power distribution resembles the head of a bat and is hereinafter referred to as a "bat ears" distribution. The ratio of the peak intensity or magnitude of the power in the outer regions to the average intensity or magnitude of power in the central region is greater than or equal to 1.2.

The substantially constant distribution in the central region provides substantially uniform energy deposition and material processing in the central region. The increased power distribution at the outer regions compensates for the increased energy or heat flux in this region.

The present invention may be used for LISI processing of workpieces having sufficient volume such that the region of the workpiece outside the energy deposition region (the nonenergy deposition region) acts as a large heat sink. The heat sink properties of the workpiece causes the increased energy or heat flux at the interface between the energy deposition region and the nonenergy deposition region.

The substantially step function decrease in power distribution at the end regions provides for controlled material processing in a region approximately equal to the width of the power distribution. This provides improved material processing where the laser beam is applied to the workpiece along contiguous parallel paths. In such processing, it is desirable to minimize beam overlap because such overlap increases the energy deposition in overlapping regions relative to the energy deposition in the central region of the beam, and decreases area coverage processing rates.

An apparatus of the present invention is also directed toward a combination of optical elements for producing the laser beam of the present invention. This combination of optical elements comprises a collimating optical element, a first cylindrical optical element, and a second cylindrical optical element.

The apparatus is comprised of optical elements oriented to obtain described characteristics of dimension and energy distribution. The apparatus provides for appropriate focusing of collimated or uncollimated input laser beams and may be configured to occupy minimal volume. The focal length of the apparatus may be modified to meet existing or desired performance requirements.

Because operation will typically occur at conditions other than those for a corresponding circular beam, the amount of back-reflected energy and subsequent likelihood of damage may be minimized for applications with a fiber optically delivered input laser beam. The apparatus may be designed with active or passive cooling of optical elements to allow continuous operation at high power throughput conditions.

A gas delivery system may be incorporated with the apparatus to assist the laser processing, cool the apparatus, or provide a means of preventing contamination of the optical elements. The apparatus may be made of any structural material, but would likely include opaque walls for beam safety considerations. The inner and outer wall surfaces may be coated to increase absorption of any spurious reflections. A protective cover glass could also be used to protect optics from contamination without altering the effectiveness of the apparatus. The apparatus could be designed so that it would breakaway from a mounting bracket rather than break itself.

DESCRIPTION OF THE PREFERRED EMBODIMENTS

Figure 1A:
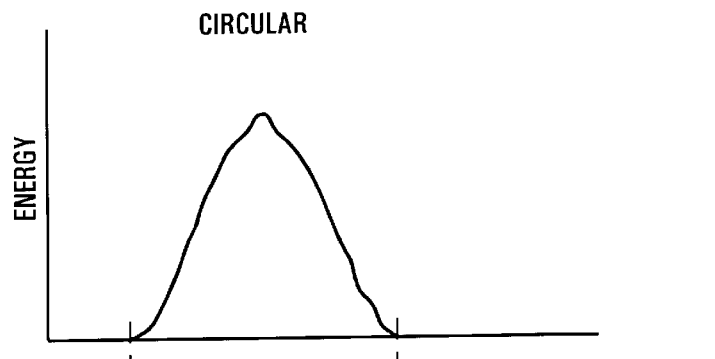
FIG. 1A depicts a Gaussian power distribution of a prior art beam.
Figure 1B:
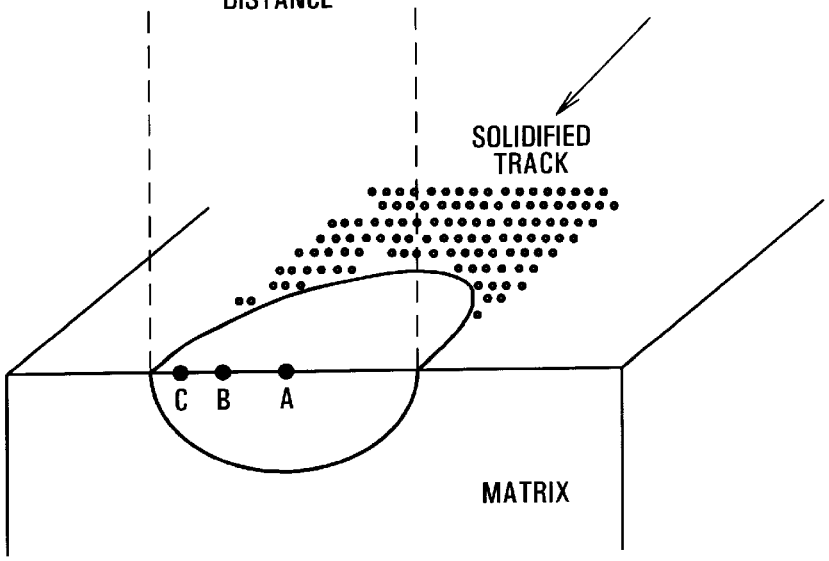
FIG. 1B depicts a typical melt region of the prior art beam depicted in FIG. 1A.
Figure 1C:
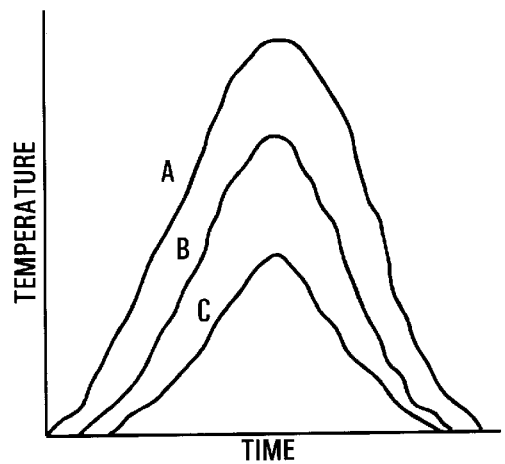
FIG. 1C depicts a temperature history of a prior art beam resulting from the melt region profile depicted in FIG. 1B and the power distribution depicted in FIG. 1A.
Figure 2A:
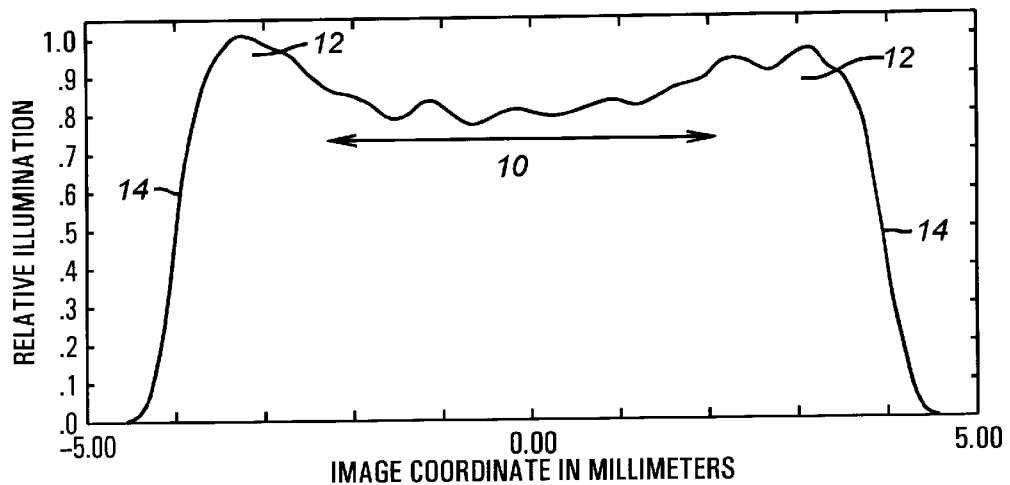
FIG. 2A depicts the power distribution in the width dimension of the laser beam of the present invention.
Figure 2B:
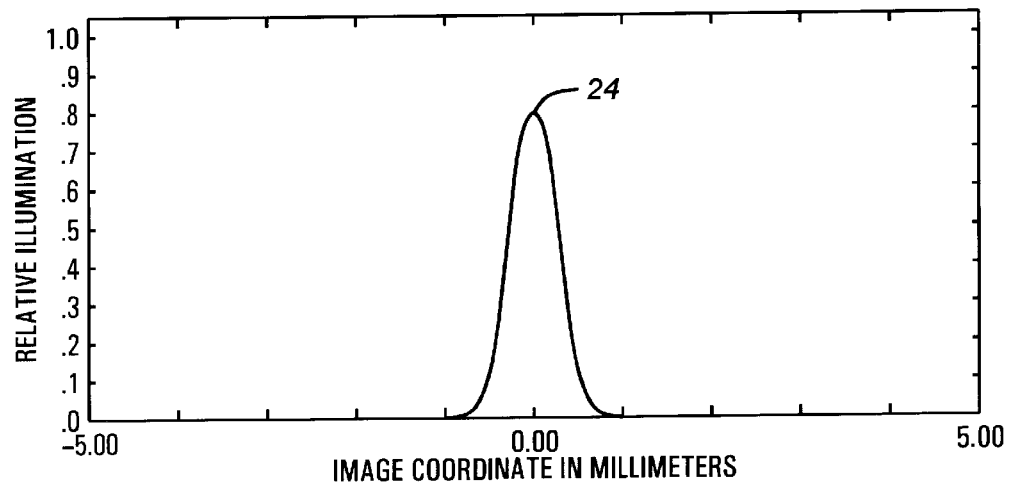
FIG. 2B depicts the power distribution in the length dimension of the laser beam of the present invention.
Figure 2C:
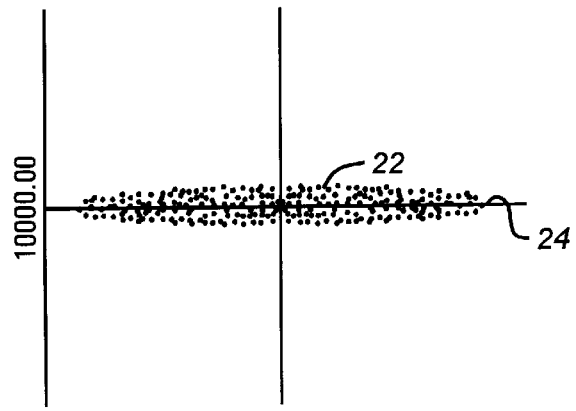
FIG. 2C depicts a top view of the rectangular cross sectional profile of a laser beam of the present invention.

In a preferred embodiment, the laser beam of the present invention has a rectangular cross sectional profile 20 comprising a width dimension 22 and a length dimension 24, as shown in FIG. 2C. In a preferred embodiment, the width dimension of said beam is at least 8 times the size of the length dimension of said beam. The ratio of the width dimension to the length dimension measured at location of half maximum intensity is hereinafter referred to as "aspect ratio".

As shown in FIG. 2A, the laser beam of the present invention comprises a power distribution in the width dimension that is substantially constant in the central region 10, increased at the outer regions 12, and which decreases in a substantially step function fashion at the end regions 14 of the width dimension. The ratio of the intensity or magnitude of the power distribution in the outer regions to the intensity or magnitude in the central region is greater than or equal to 1.2. This ratio is hereinafter referred to as the "outer to central intensity ratio".

In a preferred embodiment, as shown in FIG. 2A, the central region extends at least 50% of the width of the beam. In another preferred embodiment, as shown in FIG. 2A, the central region extends in a range of 60%–75% of the width of the beam.

In a preferred embodiment, the power distribution in the length dimension is substantially constant as shown in FIG. 2B. In a preferred embodiment, as shown in FIG. 2B, the size of the length dimension is less than one millimeter.

In a preferred embodiment, the laser beam of the present invention is selectively moveable along an axis parallel to the length dimension of said beam.

Figure 3:
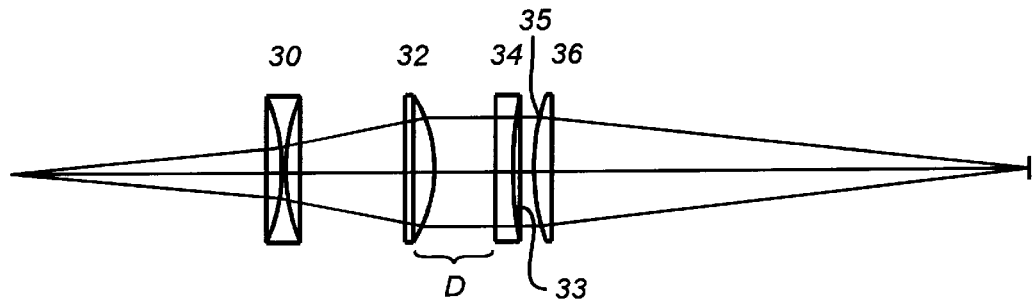
FIG. 3 depicts a side view of the apparatus embodiment of the present invention.
Figure 4:
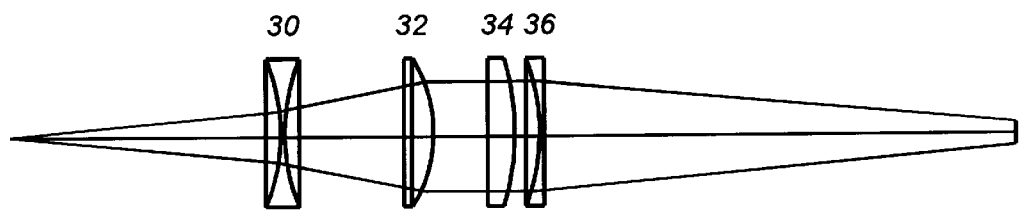
FIG. 4 depicts a top view of the apparatus embodiment of the present invention.

An apparatus of the present invention is also directed to shaping a laser beam emitted from a laser source to have a peak outer to average central intensity ratio greater than or equal to 1.2. This apparatus is depicted in FIGS. 3 and 4. It comprises a collimating optical element 32 positioned to collimate a laser beam emitted from a source. The invention further comprises a first cylindrical optical element 34 having a first curved outer surface 33. The first cylindrical optical element is positioned to receive a collimated laser beam from the collimating optical element. The first cylindrical optical element is spaced 0.1 mm to 5,000.0 millimeters from the collimating optical element. This variable spacing distance is denoted by the letter "D" in FIG. 3.

The invention further comprises a second cylindrical optical element 36 having a second curved outer surface 35 that is oriented in a range of 89.5 degrees to 90.5 degrees out of rotational alignment with the first curved surface. The second cylindrical optical element is positioned to receive a laser beam from the first cylindrical optical element. In a preferred embodiment, the first and second curved surfaces face each other.

As shown in FIGS. 3 and 4, a preferred embodiment of this invention further comprises a biconcave lens 30 positioned between a laser beam source and the collimating optical element, so as to project a more divergent laser beam on said collimating optical element than would exist without the biconcave lens.

Figure 5:
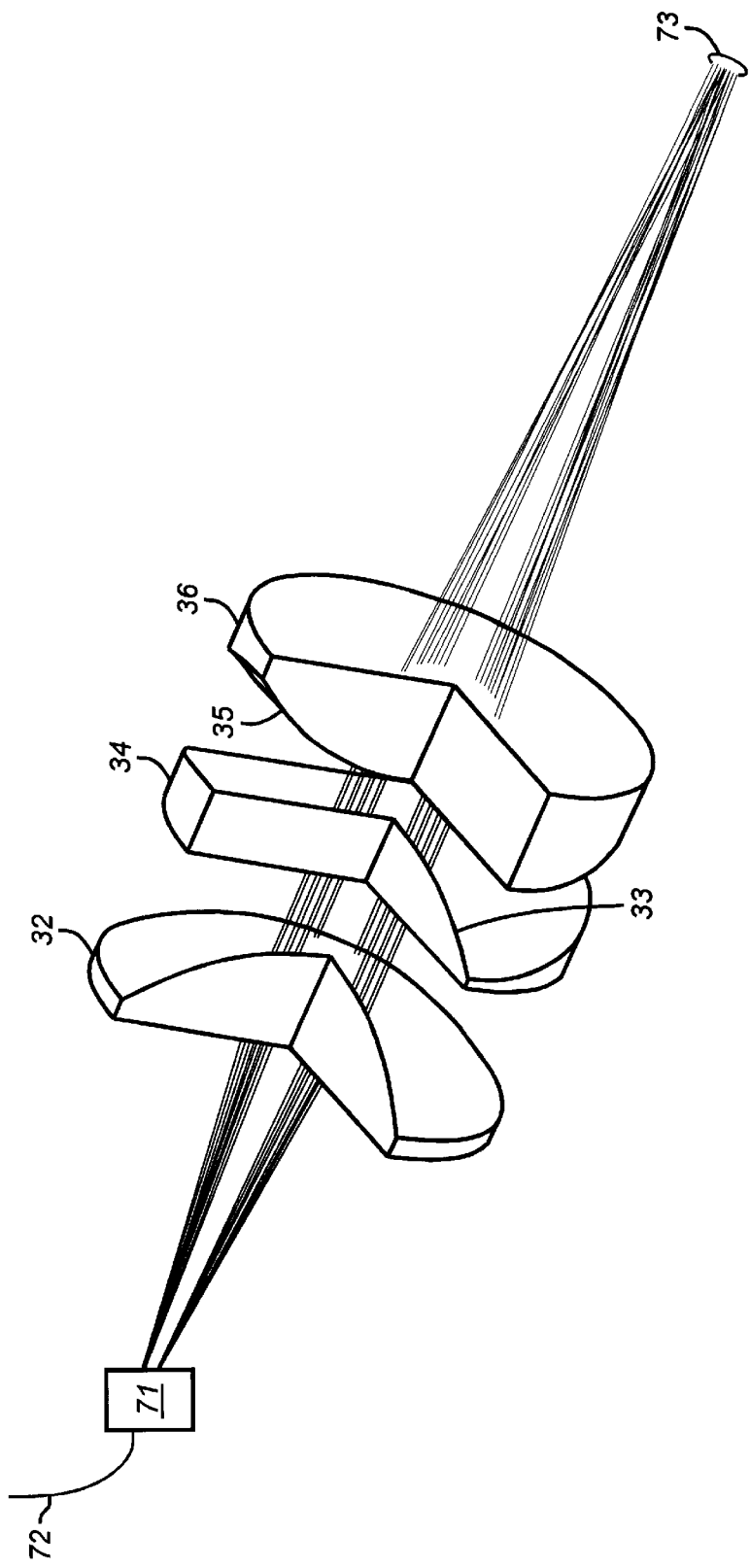
FIG. 5 depicts an isometric view of the apparatus embodiment of the present invention.

In another preferred embodiment, the invention further comprises a laser source 71 capable of emitting laser light having a wave length of 1.06 microns and further comprising a 600 micron diameter fiber 72 from which said laser beam exits as shown in FIG. 5. In a preferred embodiment, the laser beam has a divergence angle of 4.4 degrees. In this preferred embodiment, the lens may be constructed of fused silica glass and would further comprise an antireflection coating suitable for use with normal incidence radiation having a wave length of 1.06 microns.

In another preferred embodiment, the biconcave lens has a focal length of 75 mm and is positioned 98 mm from the effective point source location of the laser beam. The collimating optical element is a spherical optical element having a focal length of 100 mm and located 41.3 mm from the biconcave lens.

In a preferred embodiment, the first cylindrical optical element is a cylindrical lens having a focal length of 200 mm, located 22 mm from the collimating optical element. In a preferred embodiment, the second cylindrical optical element is a cylindrical lens having a focal length of 152.4 mm and located 5 mm from the first cylindrical optical element. The second cylindrical optical element is rotated 90 degrees around the axis of beam travel with respect to the first cylindrical optical element and is oriented to have its curved surface facing the first cylindrical optical element, as shown in FIG. 5. In a preferred embodiment, the focal plane 73 at which the desired energy distribution is obtained is located 167.2 mm from the second cylindrical optical element.

The foregoing disclosure and description of the invention are illustrative and explanatory. Various changes in the size, shape, and materials, as well as in the details of the illustrative construction may be made without departing from the spirit of the invention.

What is claimed is:

1. A laser beam comprising a central region and two outer regions, each of said outer regions comprising an outer edge, said laser beam comprising a power distribution that is substantially constant in the central region, increased at the outer regions, and which decreases at the outer edges such that the peak outer to average central intensity ratio of said beam is greater than or equal to 1.2.

2. The laser beam of claim 1 wherein said laser beam has a rectangular cross sectional profile comprising a width dimension and a length dimension.

3. The laser beam of claim 2 wherein said central region extends at least 50% of the width of said beam.

4. The laser beam of claim 3 wherein said central region extends 60–75% of the width of said beam.

5. The laser beam of claim 2 wherein said beam has an aspect ratio greater than or equal to 8.

6. The laser beam of claim 2 wherein the size of said length dimension is less than one millimeter.

7. A laser beam having a rectangular cross sectional profile comprising a width dimension and a length dimension, said width being at least eight times the size of said length dimension, said beam further comprising a power distribution in the width dimension, said power distribution comprising a central region and outer regions comprising outer edges, said distribution being substantially constant in the central region, increased at the outer regions, and decreasing at the outer edges of said width dimension.

8. The laser beam of claim 7 wherein said central region extends at least 50% of the width of said beam.

9. The laser beam of claim 7 wherein the peak outer to average central intensity ratio of said beam in the width dimension is greater than or equal to 1.2.

10. An apparatus for shaping a laser beam emitted from a laser beam source to have a peak outer to average central intensity ratio greater than or equal to 1.2 comprising:
 a. a collimating optical element positioned to collimate a laser beam emitted from a fiber optic source;
 b. a first cylindrical optical element having a first curved outer surface, said first cylindrical optical element being positioned to receive a collimated laser beam from said collimating optical element, wherein said first cylindrical optical element is spaced 0.1 to 5,000.0 millimeters from said collimating optical element;
 c. a second cylindrical optical element having a second curved outer surface that is oriented 89.5–90.5 degrees out of rotational alignment with said first curved surface, said second cylindrical optical element being located 5 millimeters from said first cylindrical optical element; and
 d. a biconcave lens positioned between a laser beam source and said collimating optical element so as to project a more divergent laser beam on said collimating optical element.

11. The apparatus of claim 10 wherein said collimating optical element is a collimating lens.

12. The apparatus of claim 10 wherein said first and second cylindrical optical elements are cylindrical lenses.

13. The apparatus of claim 10 wherein the focal length of said first cylindrical optical element is 200 millimeters.

14. The apparatus of claim 10 wherein the focal length of said second cylindrical optical element is 152.4 millimeters.

15. The apparatus of claim 10 wherein said first and second curved surfaces face each other.

* * * * *